June 1, 1937.     J. S. ALLEN     2,082,476

GARDEN TOOL

Filed Jan. 17, 1936

Witness
Robert G. Trumbull

Inventor
John S. Allen
By Clayton L. Jenks
Attorney

Patented June 1, 1937

2,082,476

UNITED STATES PATENT OFFICE 2,082,476

GARDEN TOOL

John S. Allen, Worcester, Mass.

Application January 17, 1936, Serial No. 59,595

3 Claims. (Cl. 97—60)

This invention relates to garden tools and more particularly to hand implements for loosening the soil around plants.

In garden beds where flowers and vegetables are cultivated, the plants may be closely spaced and thus make it difficult to loosen the soil and remove the weeds close to the plants themselves. Likewise, overhanging bushes often grow in such a shape as to hinder proper cultivation of the soil near the roots. Some types of soil such as those containing a large amount of clay require frequent treatment and especially after a rain storm and a subsequent baking heat from the sun. The standard garden implements i. e. a hoe and rake as well as combinations of these two tools, are often found unsatisfactory for working under such conditions among the garden plants.

It is, therefore, the primary object of this invention to provide a hand tool which may be readily employed and easily operated among the plants and bushes for loosening the soil and removing weeds and which in particular is simple in its construction and economical to manufacture.

With this and other objects in view as will be apparent from the following disclosure, my invention resides in the construction of a garden tool as herein described and as set forth in the claims appended hereto.

In accordance with this invention, I have provided a hand tool comprising in general a shank arranged to be rotated by a handle manually and a cutting head having a set of prongs or teeth adapted to be thrust into the ground and then given a rotating motion by a twist of the wrist and thus serve to stir the dirt around the plants being treated. This tool is so constructed that it will serve efficiently for agitating the dirt and avoiding insofar as possible the dirt clinging thereto and thus being removed from the garden bed instead of left in a loosened condition.

Referring to the drawing which illustrates two embodiments of my invention:

Figure 1:
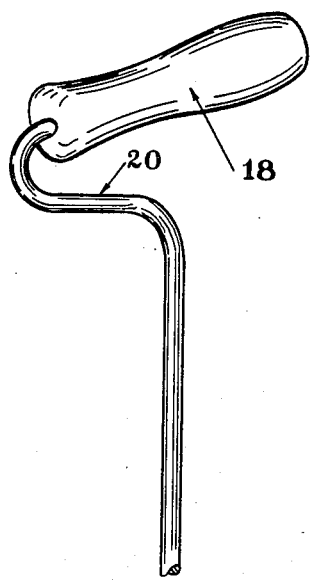
Fig. 1 is a perspective view, partly broken away, of one form of garden tool in which the shank is made of round stock.

The preferred form of garden tool, as shown particularly in Fig. 1, comprises a cutting head made up of a metal plate shaped to form a disk-shaped member 10 having a plurality of spaced teeth 12, i. e. two or more, depending therefrom and a centrally located pivot 14 about which the teeth 12 are intended to revolve during use of the tool. The disk and its teeth are rigidly secured to a shank 16 of suitable length so that the device may be operated by means of the handle 18, which is adapted to be grasped by the hand and revolved back and forth to agitate and loosen the dirt by means of the teeth 12 and 14. The handle 18 is illustrated in Fig. 1 in the conventional form, but it may be made of any suitable material and shape and fastened to the end of the shank 16 as desired. If the handle is made of wood, it may have a central hole into which the end of the shank 16 is tightly fitted. The shank 16 has preferably a double bend at its handle end to provide a substantially S-shaped support for the laterally projecting handle 18, as shown in Fig. 1, so that the center of the handle 18 will be substantially aligned with the shank 16, whereby the thrust involved in the effort to force the cutting teeth into the ground will be transmitted substantially lengthwise of the shank and thus will not readily bend it during use. The bent portion 20 of the shank will, of course, be spaced sufficiently far from the handle 18 to permit the handle to be grasped without interference.

Figure 2:
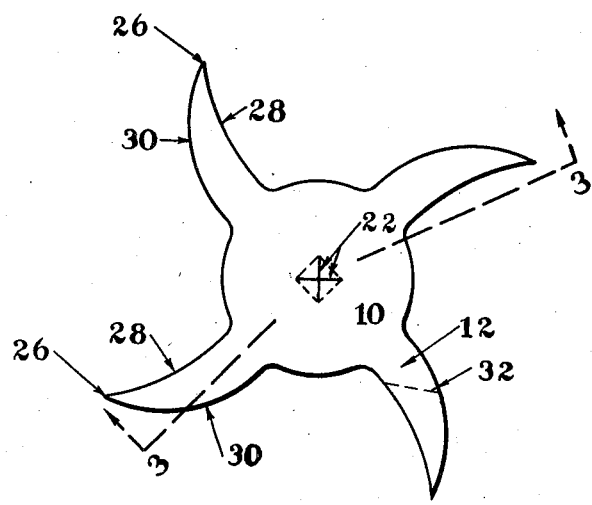
Fig. 2 is a plan view of the disk and teeth as cut from a blank.

The teeth may be shaped and supported in various ways, but my preferred construction comprises a thin metal plate having four teeth formed therewith by a dieing operation, wherein a blank is cut to the shape illustrated in Fig. 2 after which the teeth are bent down into their proper positions. If desired, the teeth may be fashioned separately from suitable stock, whether round or of other shape, and then suitably fastened to the disk, as by welding, or the cutting head may be formed as an integral unit by a casting operation. The construction illustrated is, however, preferred because of the advantages hereinafter set forth.

Figure 3:
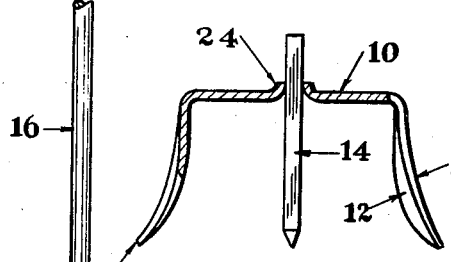
Fig. 3 is a vertical section of the blank, taken on the line 3—3 of Fig. 2, after it has been bent to final form and showing in vertical elevation a shank of square cross section.
Figure 4:
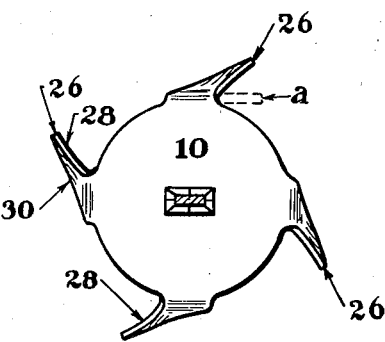
Fig. 4 is a section on the line 4—4 of Fig. 1 showing a top plan view of the cutting disk.
Figure 5:
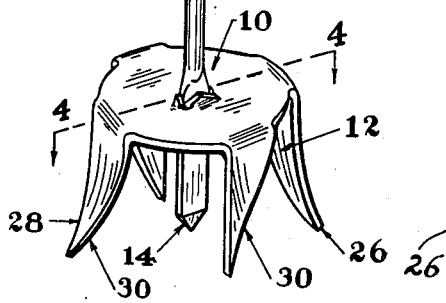
Fig. 5 is a section, similar to Fig. 3, showing the round shank of Fig. 1 and cutting disk.

Since a convenient method of manufacture involves having the central pointed pivot 14 formed as a continuation of the shank, then the blank shown in Fig. 2 may be so shaped that the shank may be inserted therethrough and be suitably secured to it. In Figs. 2, 3, and 4, the blank has been so shaped as to provide for the insertion of a square shank therethrough. Figs. 1 and 5 show a round shank. In order that the parts may be rigidly fastened together, it is preferred to cut the blank along the diagonal lines 22 indicated in Fig. 2 and to bend upwardly the triangularly shaped flanges 24 and thereby form a hole in the blank through which the shank may be inserted. The flanges are intended to engage the sides of the shank and to be welded thereto, as by a spot welding operation. If the shank 16 is made of round stock as shown in Fig. 1, then it is preferable that the lower end be suitably shaped in a press to form a flat pointed portion 25 (Fig. 5) which will give more agitation to the soil than would a round tooth. This tooth is, however, flattened for the primary purpose of transmitting the rotary motion from the shank 16 to the disk 10. In this case the plate may be cut, as indicated in Fig. 4, to provide a substantially rectangular slot therethrough and to form the upturned flanges which engage the shank and further strengthen the welded joint. Because of the rectangular shapes of the shank and slot the head 10 cannot rotate relative to the handle. If desired, the parts may be held in place by pins passing through the shank above and below the tooth supporting head or through the flanges 24. Numerous schemes may be adopted for the purpose.

Although the teeth may be shaped to have any suitable and desired cross section, it is preferred that they be made as flat metal plates of considerable surface area so as to provide extensive plow faces to stir up the dirt. They are preferably substantially wedge shaped and pointed at their lower ends so as to penetrate and agitate the dirt easily. They should serve as cultivator teeth which when revolved do not rotate in a narrow path but plow up a considerable amount of dirt. To this end, each tooth is preferably shaped, as shown in Fig. 2, to have a pointed or wedge shaped end 26 formed by a front concave edge 28 and a rear convex edge 30. The two edges may slope forwardly in such a manner that two opposed teeth on opposite sides of the disk will project in opposite directions, so that clogging of the head is minimized and when the tool is thrust downwardly into the ground the teeth will act like a helical thread and serve to rotate the head in a clockwise direction and thus aid the operator in turning the tool. It is to be noted that the tooth, as shown at $a$ by dotted lines in Fig. 4, will extend in a substantially tangential direction from the circular outline of the disk 10, so that the tooth will have a flat face projecting laterally at an angle to its path of revolution which is so arranged that it will plow side ways through the dirt. This aids primarily in preventing the tool from cutting a cylindrical plug of earth and removing it from the ground, if the dirt is at all sticky. The outwardly projecting tooth cuts into and agitates the dirt and cannot readily permit the latter to adhere to it. These teeth may also be given a slight twist or bent to a desired extent, such as about the line 32 (Fig. 2), so that their points will project to an even greater extent beyond the disk circle and so engage and agitate more of the soil as indicated in Fig. 4.

The teeth may be blunt on their forward edges as illustrated, so as to stir up the soil easily and not require sharpening. If desired, the forward edge 28 may be shaped as a knife edge adapted for cutting roots readily. However, the tool is intended primarily for stirring up the soil, as would a rake or hoe, but without removing it, and it is necessary that the teeth be so shaped and arranged as to leave the dirt in place and without interfering seriously with the plants among which one is working.

It is also desirable for quick and safe use that the tool include the central tooth 14, which serves as a pivot point about which the other teeth revolve. If this central tooth were not present, the tool might tend to rotate about some one of the other teeth and so make the device unwieldy or uncontrollable. Also, the teeth are all substantially of the same length, although the pivot tooth may be made slightly longer if desired. It is preferred that the number of cutting teeth be small, such as from 2 to 6, and that they be widely spaced, so that they will agitate and not pick up the dirt. The outer teeth 12 should also be spaced widely from the central pivot 14 for the same reason. The teeth should be of such length as to agitate the soil properly and prevent the disk 10 from coming into contact with the dirt and packing the same down to any material extent. In the preferred construction, the plate forming the disk and teeth is a piece of sheet metal about $\frac{1}{8}$ inch thick and 3 inches in diameter. The whole device is made about 2½ feet long and the shank may be made of quarter-inch stock. It will, however, be appreciated that these dimensions are not limitations on this invention but are merely illustrative of a preferred type of garden tool. Also, it will be understood that the disk 10 may be replaced by other constructional equivalents, since its primary function is merely that of supporting the outer teeth 12. These teeth may be fastened directly to the shank if desired in a radial arrangement and bent to the required positions for engaging the soil in which case the supporting head is formed as a part of the tooth construction. Also the teeth need not be pointed, since the comparatively thin sheet metal, even if provided with a blunt edge, may be thrust into the ground with comparative ease. The dimensions and shapes of the teeth may be widely varied, provided the teeth are kept comparatively small in size and are so arranged that the tool may be operated easily by one hand and without serious fatigue. Many modifications of the invention will be readily apparent in view of the above disclosure; but since the device is to be used as an agitator of the soil, the constructional features thereof are accordingly to be so made as to serve this primary function. It is particularly necessary that the tool be freely movable and not mounted on standards or employed with other devices which would materially hinder its use. The teeth must be freely inserted into the ground to the desired depth limited only by the tooth length. The device must be light in weight and easily operated by a slight wrist motion when held either in a vertical position or inclined at any angle, as when thrust beneath a bush. Its simplicity of construction is therefore an essential characteristic.

Having thus described my invention, what I claim as new and desire to secure by Letters Patent is:

1. A garden tool comprising a cutting head including a perforated sheet metal plate, a shank passing through the plate which has a handle at one end and forms a pivotal tooth at the other, the plate being shaped to provide a plurality of depending, widely spaced, flat sided cutting teeth which have concave forward edges and convex rear edges and are so arranged that opposed teeth project in opposite directions and serve to agitate the soil without clogging when revolved about the pivot.

2. A garden tool comprising a long shank having a handle at one end arranged for rotating the shank, a metal plate secured to the shank adjacent to its other end, said shank projecting through the metal plate and providing a central pivotal tooth, flat sided teeth mounted on the plate which are spaced from and arranged substantially parallel with the pivotal tooth, said flat teeth being pointed at their lower ends and twisted outwardly so as to provide extensive faces defining a broad rotational path in which the sides of the teeth engage and agitate the soil.

3. A garden tool comprising a cutting head including a perforated sheet metal plate, a shank passing through and secured to the plate which has a handle at one end and forms a pivotal tooth at the other, the plate being so shaped and bent as to provide a plurality of depending, thin, flat sided, wedge shaped teeth spaced from one another and arranged to revolve substantially edgewise about the pivotal tooth, the point of each tooth being in advance of the upper part of the front edge of the tooth and outside of the cylindrical path of revolution thereof, so that both the points and the sides of the teeth agitate without removing the soil when revolved about the pivotal tooth during use.

JOHN S. ALLEN.